(No Model.)
J. W. MOSER.
LAND MARKER.
No. 549,247.
Patented Nov. 5, 1895.
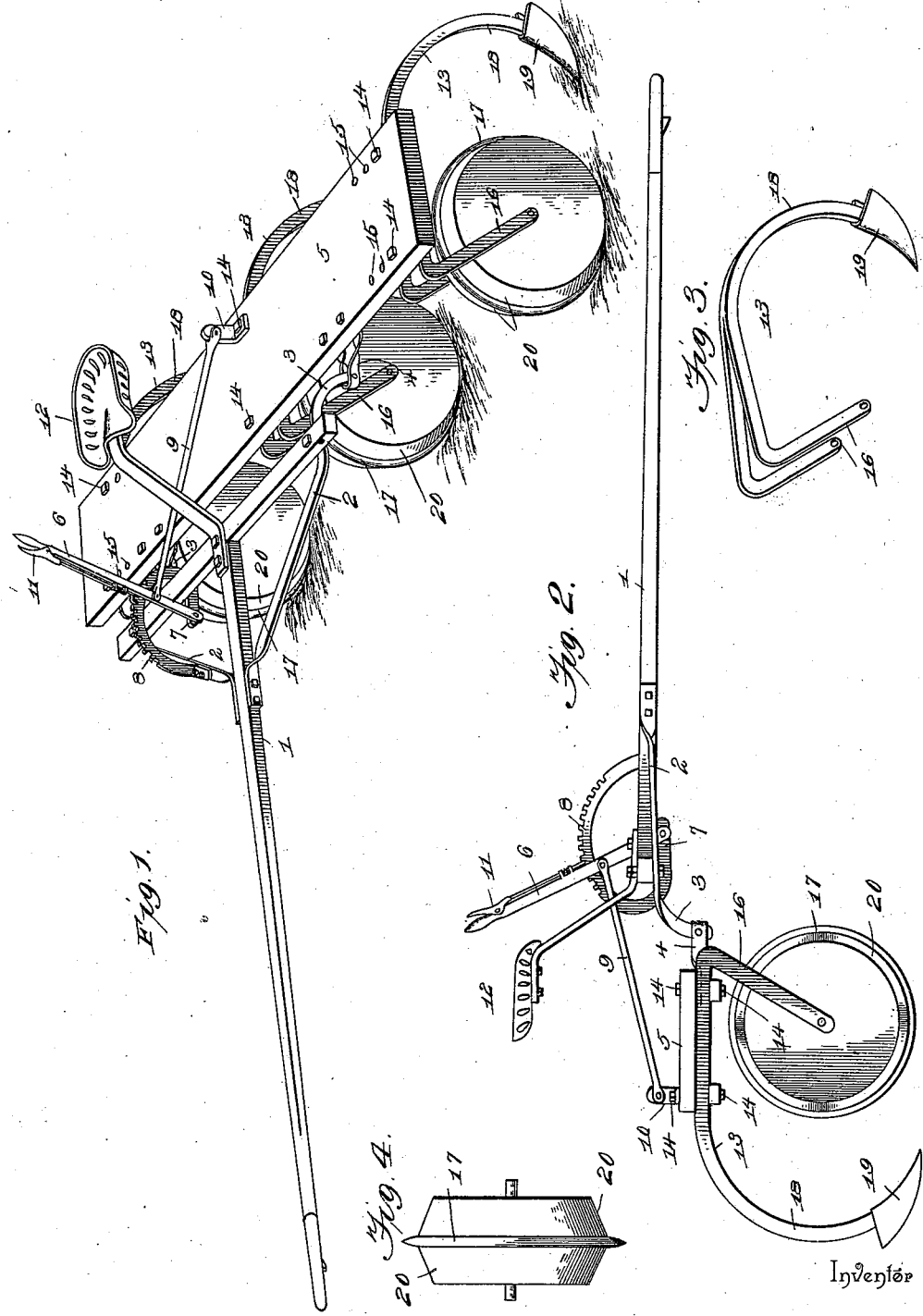
Witnesses
John C. Shaw
R. M. Smith
Inventor
Jacob W. Moser,
By his Attorneys,
C. A. Snow & Co.

UNITED STATES PATENT OFFICE.

JACOB W. MOSER, OF CASEYVILLE, ILLINOIS.

LAND-MARKER.

SPECIFICATION forming part of Letters Patent No. 549,247, dated November 5, 1895.

Application filed March 19, 1895. Serial No. 542,381. (No model.)

*To all whom it may concern:*

Be it known that I, JACOB W. MOSER, a citizen of the United States, residing at Caseyville, in the county of St. Clair and State of Illinois, have invented a new and useful Land-Marker, of which the following is a specification.

This invention relates to an improvement in land-markers, being designed for use in either soft or hard soil for marking off the ground preparatory to planting corn, potatoes, cabbage, &c.

The objects of the invention are to simplify and improve the construction of land-markers and to provide a machine which shall be simple and inexpensive in construction, strong and durable in practice, adjustable for varying the depth of cut and the distance between the furrows, which will press the soil firmly and smoothly on either side of the furrow, lighten the draft on the team, prevent side slipping of the machine, and in all respects be thoroughly efficient in operation.

To this end the present invention consists in the combination, with a suitable tongue-frame, of a platform hinged thereto and supported upon rotary disks; in providing the hinged platform with rigidly-attached shovels located in rear of the rotary disks and in the means interposed between the tongue-frame and said platform for adjusting the angle of the platform and the depth of cut of the shovels; in providing the hinged platform with laterally-adjustable yokes and mounting therein the rotary disks having peripheral cutting-flanges; also in certain novel features and details of construction and arrangement of parts hereinafter fully described, illustrated in the drawings, and pointed out in the claims.

In the accompanying drawings, Figure 1 is a perspective view of a land-marker constructed in accordance with my improvements. Fig. 2 is a side elevation of the same. Fig. 3 is a detail perspective view of one of the adjustable yokes. Fig. 4 is a front elevation of one of the rotary disks.

Similar numerals of reference indicate corresponding parts in the several figures of the drawings.

Referring to the drawings, 1 designates a suitable tongue-frame constructed in any usual or preferred manner and provided with inclined braces 2, which are extended in rear of the tongue-frame, as indicated at 3, to form downwardly-extending curved arms pivoted at their lower ends to brackets 4, attached rigidly to the lower face of a tilting platform 5.

The transversely-extending tilting platform thus has a hinged relation to the tongue-frame, and the angle of said platform with relation to the tongue-frame is capable of being adjusted by means of a hand-lever 6, which is pivoted at its lower end to an extension 7 of a segmental rack 8, secured rigidly to the tongue-frame, as shown. A pivoted link or rod 9 is interposed between the hand-lever 6 and a bracket or angle iron 10, secured to the upper side of the transversely-extending platform 5. By rocking or vibrating the lever 6 the platform 5 may be tilted to any desired angle for a purpose which will hereinafter appear, and when adjusted to the desired angle the platform may be held by means of a thumb-latch 11, carried by the lever 6 and engaging the segmental rack 8. The driver's seat 12 is shown attached to the tongue-frame.

Beneath the transversely-extending tilting platform 5 is secured a series of yokes 13, three of said yokes being shown. The central yoke is secured fixedly to the lower side of the platform 5 by means of bolts 14, passing up through said platform. The end yokes are secured to the platform in the same manner as the central yoke, but are made adjustable toward and away from the central yoke by means of a plurality of perforations 15 in said platform. When it is desired to decrease or increase the distance between the furrows, the bolts 14 may be removed and the yokes adjusted to the desired position and again secured in place in a manner that will be readily understood.

Each yoke 13 comprises at its front end a pair of downwardly-extending arms 16, having horizontally-aligned perforations in their lower ends for the reception of a short shaft or spindle, upon which a rotary disk is mounted. Each disk is provided with a centrally-arranged peripheral flange or cutter 17, of considerable depth, (about one and three-quarters inches in a full-sized machine,) extending entirely around the disk and preferably formed from metal, while the remainder of the disk is usually made from wood. Upon either side of the flange 17 the peripheral face of the disk is beveled or inclined in opposite directions, as indicated in Fig. 4. In the forward movement of the machine the peripheral flange 17 will cut a furrow or groove, while the beveled or inclined face or periphery of the disk will press the soil firmly and smoothly upon either side of said furrow or groove, thus putting the ground in good shape to receive the sets. Each yoke 13 also comprises a rearwardly-extending curved arm 18, upon the lower end of which is mounted a stationary shovel 19, following the line of travel of the disk mounted in said yoke.

From the foregoing description it will be apparent that the platform 5 is mounted upon the rotary disk for its support, and when adjusted by means of the hand-lever 6 it will be tilted or rocked upon the disk-centers as a fulcrum. The shovels 19 by means of their fixed relation with the tilting platform will be raised or lowered according as said platform is tilted, the object of this construction being to provide additional means where the ground is hard for assisting in cutting the furrows and for increasing the depth of such furrows when desired.

The machine is well adapted for preparing the ground for corn, potatoes, &c.; also doing away with the old method of sticking holes in the soil with a wooden pin for setting out cabbage-plants. By means of the tapering or inlined peripheries 20 of the disks the soil is firmly and smoothly packed or pressed upon either side of the groove, and by means of the adjusting-lever the shovels may be raised or lowered for regulating the depth of the furrow. The draft on the team is much lighter than in the old-fashioned "drag-marker" in common use, and it will also be apparent that by means of the peripheral flanges on the rotary disks the improved machine described will be prevented from slipping laterally, thereby insuring the formation of straight and even furrows, even when used upon hillsides.

Various changes in the form, proportion, and the minor details of construction may be resorted to without departing from the principle or sacrificing any of the advantages of this invention.

Having thus described the invention, what is claimed as new, and desired to be secured by Letters Patent, is—

1. In a land marker, a tilting platform mounted upon and in combination with a series of rotary disks, the peripheral flanges surrounding said disks, and the movable yokes interposed between said disks and the platform and adjustable transversely of said platform, substantially as and for the purpose described.

2. In a land marker, a transversely extending platform mounted upon and in combination with, a series of rotary disks provided with centrally arranged peripheral flanges and with oppositely inclined or tapering peripheral surfaces upon either side of said flanges, and a corresponding series of yokes interposed between said disks and the platform and adjustable transversely of the latter, substantially as specified.

3. In a land marker, a transversely extending platform, in combination with a series of laterally adjustable yokes thereon, a corresponding series of rotary disks swiveled in said yokes, and a series of shovels having a rigid relation to the platform and located in rear of said disks, substantially as and for the purpose described.

4. In a land marker, the combination with the tongue frame, of a platform hinged thereto, an interposed lever for adjusting the angle of the platform with relation to the tongue frame, a series of yokes adjustable transversely of said platform, a corresponding series of rotary disks carried thereby, and the shovels arranged in rear of said disks and adapted to operate in the manner specified.

5. In a land marker, the combination with the tongue frame, of a tilting platform hinged thereto, a tilting lever mounted upon the tongue frame, a link interposed between said lever and the hinged platform, the laterally adjustable yokes secured to the platform, the rotary disks upon which the platform is fulcrumed mounted in said yokes, and the shovels operating in rear of said disks and having a rigid relation to the tilting platform, substantially as described.

6. In a land marker, a tongue frame, in combination with a tilting platform hinged thereto, the rotary disks upon which said platform is supported, a series of yokes in which said disks are journaled, a corresponding series of shovels secured to the rearwardly extending arms of said yokes, and means substantially as described for rocking said platform relatively to the tongue frame and upon the axes of the rotary disks as a center or fulcrum, all arranged substantially as set forth.

In testimony that I claim the foregoing as my own I have hereto affixed my signature in the presence of two witnesses.

JACOB W. MOSER.

Witnesses:
 W. H. HUECKEL,
 THEO. F. GOTSCH.